(12) United States Patent
Sheng et al.

(10) Patent No.: US 9,521,279 B2
(45) Date of Patent: Dec. 13, 2016

(54) IMAGE REPRODUCING METHOD AND DIGITAL PROCESSING MACHINE USING SUCH METHOD

(71) Applicant: AVISION INC., Hsinchu (TW)

(72) Inventors: Thomas Sheng, Hsinchu (TW); Mu-En Yang, Taipei (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 14/460,361

(22) Filed: Aug. 15, 2014

(65) Prior Publication Data

US 2015/0237232 A1 Aug. 20, 2015

(30) Foreign Application Priority Data

Feb. 20, 2014 (TW) .............................. 103105744 A

(51) Int. Cl.
*H04N 1/40* (2006.01)
*H04N 1/32* (2006.01)
*H04N 1/00* (2006.01)

(52) U.S. Cl.
CPC ........ *H04N 1/0035* (2013.01); *H04N 1/00355* (2013.01); *H04N 1/00374* (2013.01); *H04N 1/00395* (2013.01); *H04N 1/00405* (2013.01); *H04N 1/00413* (2013.01); *H04N 1/00437* (2013.01); *H04N 1/00474* (2013.01)

(58) Field of Classification Search
CPC ............ H04N 1/32251; H04N 1/40087; H04N 1/00355; H04N 1/00374; H04N 1/00395; H04N 1/00405; H04N 1/00413; H04N 1/00437

USPC ................ 358/3.01, 1.15, 500, 468; 382/283
See application file for complete search history.

(56) References Cited

U.S. PATENT DOCUMENTS

| | | | |
|---|---|---|---|
| 2005/0174592 A1* | 8/2005 | Iinuma et al. ............... | 358/1.13 |
| 2006/0072158 A1* | 4/2006 | Christie ....................... | 358/3.01 |
| 2008/0180726 A1* | 7/2008 | Selvaraj ...................... | 358/1.15 |
| 2009/0273811 A1* | 11/2009 | Omata ......................... | 358/3.01 |
| 2013/0202044 A1 | 8/2013 | Kitamura | |

FOREIGN PATENT DOCUMENTS

| CN | 101027895 A | 8/2007 |
|---|---|---|
| TW | I325718 | 6/2010 |
| TW | I403422 | 8/2013 |

\* cited by examiner

*Primary Examiner* — Quang N Vo

(57) ABSTRACT

An image reproducing method for a digital processing machine is provided. The image reproducing method includes the following steps: scanning an original to generate image data; analyzing the image data to generate an analysis result; designating M proper user setting items among N user setting items according to the analysis result, wherein N and M are positive integers, and M is less than N; providing only the M proper user setting items on a human-machine interface; and outputting a copy of the original according to a user input received through the human-machine interface. In addition, a digital processing machine providing an intelligent human-machine interface is also provided.

11 Claims, 4 Drawing Sheets

Provide even page image
flipping setting item

IMAGE REPRODUCING METHOD AND DIGITAL PROCESSING MACHINE USING SUCH METHOD

BACKGROUND OF THE INVENTION

1. Field of the Invention

The disclosed embodiments of the present invention relate to an image reproducing method and a digital processing machine using such method, and more particularly, to an image reproducing method which provides proper user setting items, and a digital processing machine using such method.

2. Description of the Prior Art

With the advancement of technology, a multi-function digital machine can offer more and more functions. For example, a multi-function printer (MFP) in an office can output images by scanning, printing, copying and faxing documents, and provide various image processing functions and user-selectable/adjustable setting items such as a page layout setting item, a color setting item and an output destination/format setting item. However, a user has to be familiar with the MFP in order to make good use of the MFP; otherwise, the user has to spend much time looking for necessary setting items from numerous setting items provided by the MFP. Hence, little time and effort is saved with the use of the MFP having powerful features. Too many setting items due to multi-function design cause inconvenience to the user.

For example, when the user wants to copy a one-sided color document to grayscale image (s), the user has to select a "copy" setting item from numerous output setting items, and then selects a print size setting item and a simplex printing setting item. Next, the user has to select grayscale printing from color options, and determines whether to change a size of the grayscale image or whether to print picture objects or text messages only. The user has to repeat the aforementioned steps each time an original document is copied. Additionally, the user has to browse all of the setting items provided by the MFP in order to select necessary setting items. However, there are many unrequired setting items (e.g. multi-up printing, two-sided page flipping, optical character recognition, output destination, etc.) displayed on the MFP while the user is operating the MFP to copy the original document. Consequently, too many complicated setting items pose a problem in looking for necessary setting items, which leads to difficulties in making good use of the features provided by the MFP, and results in user inconvenience and wasted time.

SUMMARY OF THE INVENTION

It is therefore one objective of the present invention to provide users with proper user setting items designated from numerous user setting items in order to solve the above problems.

It is therefore another objective of the present invention to provide a user-friendly intelligent human-machine interface in order to help users find necessary setting items quickly.

According to a first aspect of the present invention, an exemplary image reproducing method for a digital processing machine is disclosed. The exemplary image reproducing method includes the following steps: scanning an original to generate image data; analyzing the image data to generate an analysis result; designating M proper user setting items among N user setting items according to the analysis result, wherein N and M are positive integers, and M is less than N; providing only the M proper user setting items on a human-machine interface; and outputting a copy of the original according to a user input received through the human-machine interface.

According to a second aspect of the present invention, an exemplary digital processing machine providing an intelligent human-machine interface is disclosed. The exemplary digital processing machine a scanning apparatus, an automatic sheet feeder, a printing apparatus, an image processor, an operating platform and a controller. The scanning apparatus is arranged for scanning an original to generate image data. The automatic sheet feeder is coupled to the scanning apparatus, and arranged for feeding in the original and transporting the original to the scanning apparatus. The image processor is arranged for analyzing the image data to generate an analysis result. The operating platform includes a display and is arranged for providing a human-machine interface. The controller is operably coupled to the scanning apparatus, the automatic sheet feeder, the printing apparatus, the image processor and the operating platform. The controller is arranged for operating a user setting item designated process, designating M proper user setting items among N user setting items according to the analysis result, and instructing the operating platform to display the M proper user setting items only, wherein N and M are positive integers, and M is less than N.

These and other objectives of the present invention will no doubt become obvious to those of ordinary skill in the art after reading the following detailed description of the preferred embodiment that is illustrated in the various figures and drawings.

DETAILED DESCRIPTION

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

Figure 1:
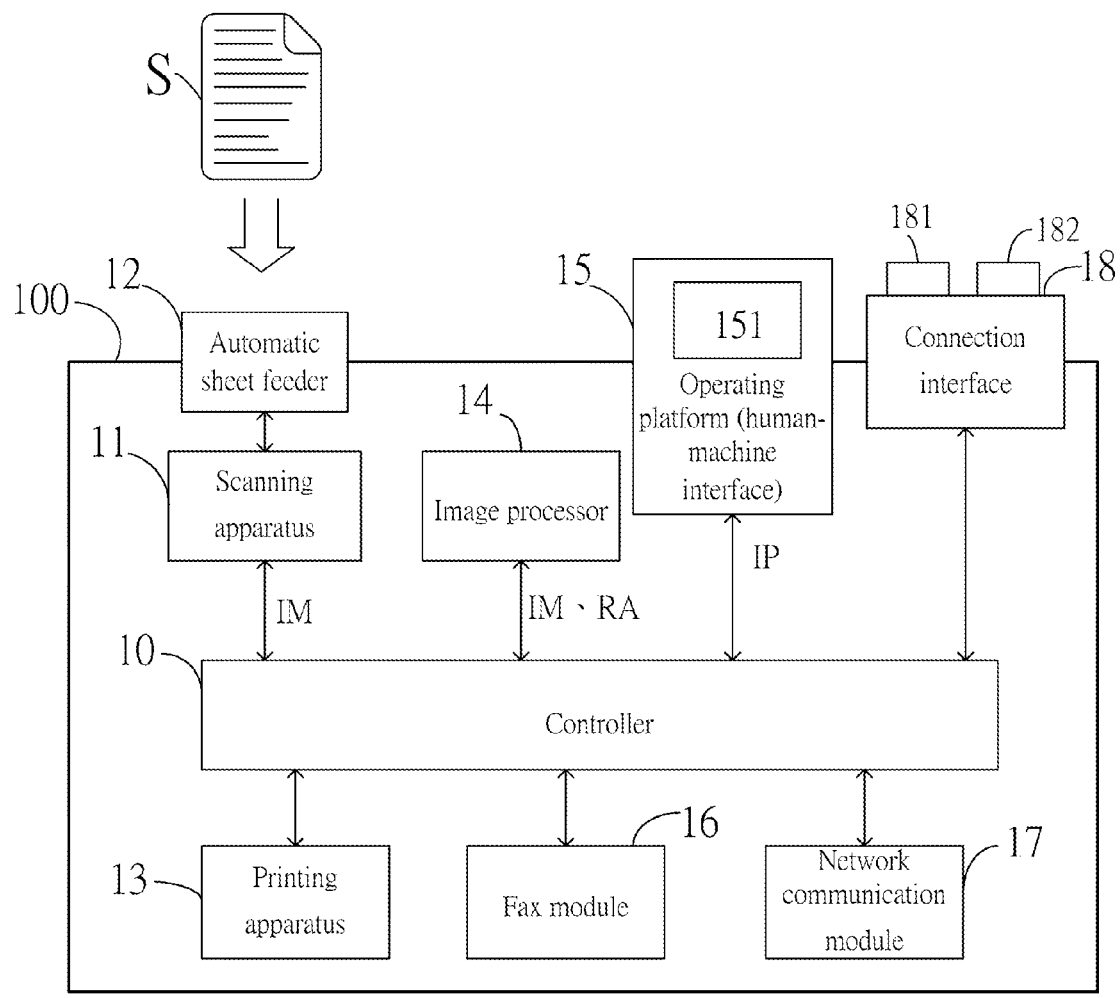
FIG. 1 is a block diagram illustrating an exemplary digital processing machine providing an intelligent human-machine interface according to a preferred embodiment of the present invention.

The proposed image reproducing method may be employed in a digital processing machine. FIG. 1 is a block diagram illustrating an exemplary digital processing machine providing an intelligent human-machine interface according to a preferred embodiment of the present invention. The digital processing machine 100 may include a controller 10, a scanning apparatus 11, an automatic sheet feeder 12, a printing apparatus 13, an image processor 14 and an operating platform 15. The scanning apparatus 11 may scan an original S to generate image data IM. The automatic sheet feeder 12 is coupled to the scanning apparatus 11, and may be arranged for feeding in the original S and transporting the original S to the scanning apparatus 11. The image processor 14 may be arranged for analyzing the image data IM to generate an analysis result RA. The operating platform 15 may include a display 151, and may be arranged for providing a human-machine interface, wherein the human-machine interface is not limited to a particular apparatus, and may be used for message exchange between a user and the digital processing machine 100. By way of example but not limitation, the human-machine interface may be implemented by a touch screen, a computer keyboard or a computer mouse. The controller 10 may be operably coupled to the scanning apparatus 11, the automatic sheet feeder 12 (through the scanning apparatus 11), the printing apparatus 13, the image processor 14 and the operating platform 15. The digital processing machine 100 may further include a fax module 16, a network communication module 17 and a connection interface 18, wherein the connection interface 18 may include an external apparatus connection interface 181 and a memory card interface 182. Each of the fax module 16, the network communication module 17, the external apparatus connection interface 181, the memory card interface 182 and the printing apparatus 13 outputs a copy of the original S according to a user input received through the human-machine interface.

Figure 2:
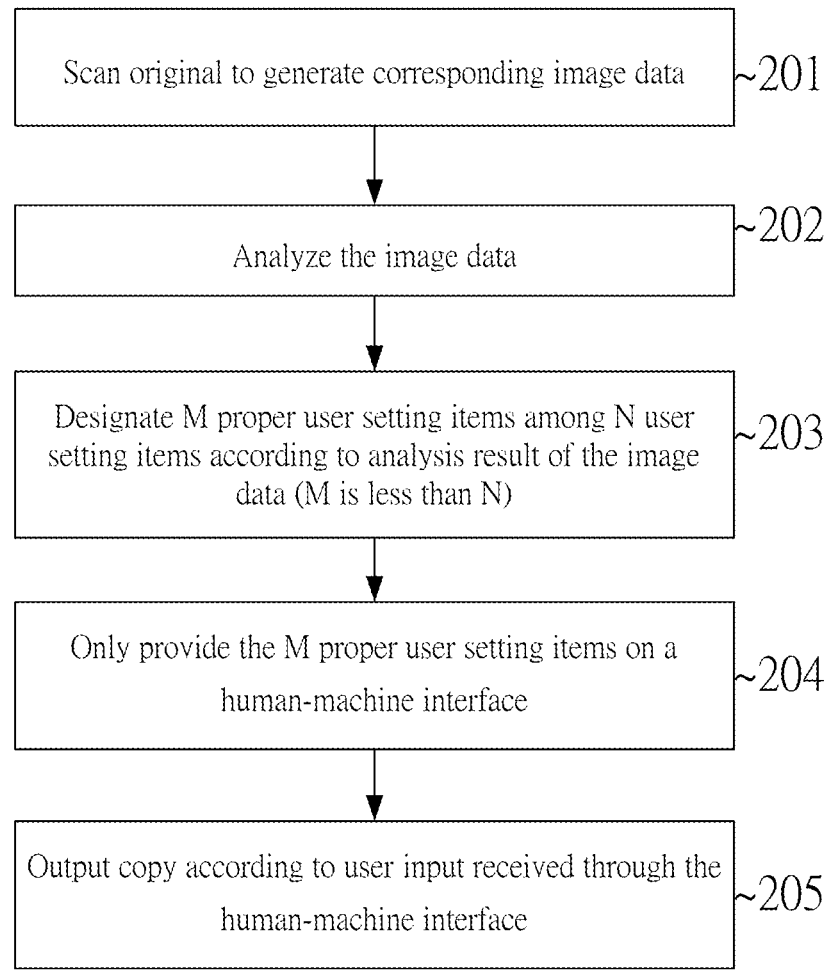
FIG. 2 is a flow chart of an exemplary image reproducing method according to a preferred embodiment of the present invention.

FIG. 2 is a flow chart of an exemplary image reproducing method according to a preferred embodiment of the present invention. Steps of the exemplary image reproducing method are described below with reference to FIG. 1 and FIG. 2. In step 201, the scanning apparatus 11 included in the digital processing machine 100 may scan the original S (by using the automatic sheet feeder 12 to feed in the original S) to generate the corresponding image data IM. Instep 202, the image processor 14 may analyze the image data IM. Next, in step 203, the controller 10 may operate a user setting item designated process, designate M proper user setting items among N user setting items according to the analysis result RA of the image data IM, wherein N and M are positive integers, and M is less than N. In step 204, the operating platform 15 may act as the human-machine interface, and the controller 10 may instruct the operating platform 15 to provide the M proper user setting items only. Finally, in step 205, the flow outputs a copy according to a user input IP received through the human-machine interface (i.e. the operating platform 15). The copy may be a physical document printed by the printing apparatus 13, fax data transmitted by the fax module 16, and/or electronic data delivered to other addresses by the network communication module 17. In one implementation, the copy may be an electronic file, which is outputted to a storage device via an interface such as the external apparatus connection interface 181 or the memory card interface 182.

Figure 3:
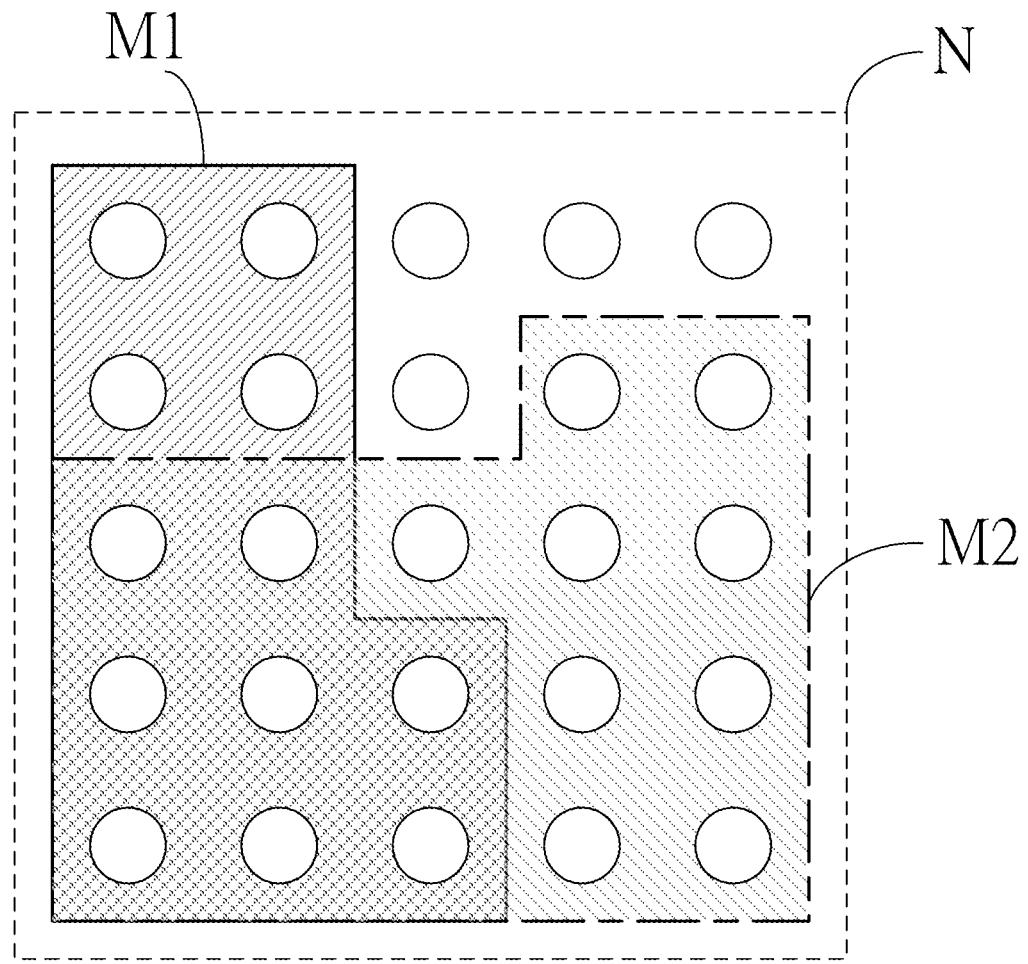
FIG. 3 is a diagram illustrating exemplary designation of user setting items according to an embodiment of the present invention.

Please refer to FIG. 3, which is a diagram illustrating exemplary designation of user setting items according to an embodiment of the present invention. Each circle shown in FIG. 3 represents a user setting item such as a page layout setting item, a duplex printing setting item, a picture editing setting item or an output destination setting item. By way of example but not limitation, the digital processing machine 100 may provide N user setting items in total in this embodiment. When the analysis result RA indicates that the image data IM meets specific conditions or has certain properties, the controller 10 may provide M proper user setting items for the user according to the analysis result RA, wherein the reset of the N user setting items (which are not provided/displayed for the user) need not be set up. For example, in a case where the image data IM corresponds to a black-and-white image, M1 proper user setting items does not include a color printing setting item. In another case where the image data IM corresponds to a picture image, M2 proper user setting items does not include an optical character recognition (OCR) setting item. With the aid of the analysis result RA of the image data IM, only M (less than N) proper user setting items are provided, thus reducing the number of displayed user setting items effectively, and facilitating fast and convenient operations.

For example, in a case where the analysis result RA indicates that the image data IM includes two valid page images (i.e. images of a two-sided document) after the original S is scanned, the M proper user setting items may include a page layout setting item and a duplex printing setting item while exclude a blank page deletion setting item. In another example, if the analysis result RA indicates that the image data IM includes a blank image, the M proper user setting items may include a blank page deletion setting item and a file splitting setting item while exclude a duplex printing setting item. In still another example, in a case where the analysis result RA indicates that the image data IM includes a picture image after the original S is scanned, the M proper user setting items may include a picture editing setting item and a color printing setting item while exclude a binary black-and-white printing setting item and an OCR setting item. In yet another example, the image data IM may correspond to a two-sided image as well as a picture image, and hence the M proper user setting items may include a page layout setting item, a duplex printing setting item, a picture editing setting item and a color printing setting item, wherein a blank page deletion setting item and an OCR setting item are not included in the M proper user setting items. It should be noted that, rather than provide specific user setting items according to the image data, the spirit of the present invention is to provide M proper user setting items according to the image data IM and omit remaining improper/unsuitable user setting items.

Additionally, one user setting item may be a union of similar settings. Hence, one user setting item may include more than one setting. For example, a color printing setting item may include a color setting and a grayscale setting provided for the user to make a selection, and a page layout setting item may include a multi-up printing setting, a page orientation setting (e.g. print in portrait orientation or landscape orientation) and a page size setting.

In addition to analyzing whether the image data IM includes a blank image or whether the image data IM includes a text/picture image, the image processor 14 may perform other types of analyses used for designation of the M proper user setting items. For example, the image processor 14 may analyze an image page size included in the image data IM, wherein the image page size may analyzed by detecting a size of the original S (when the automatic sheet feeder 12 feeds in the original S), performing image processing after the document scan is completed, or other processes. As a person skilled in the art should understand that the image page size can be recognized by various image processing methods, further description is omitted here for brevity. When the analysis result RA indicates that the image page size included in the image data IM conforms to a specific size, the M proper user setting items comprises a page layout setting item, a picture editing setting item, an automatic object recognition setting item and/or an output destination setting item. By way of example but not limitation, the specific size maybe a size of a card, a check/bill or a photo. In another example, the specific size may be a customized size such as a receipt size or a check/bill size having certain dimensions.

Specifically, as a card size or a check size is small, the user would like to print multiple images on a single page or two sides of a card/check on a single page. The digital processing machine 100 may provide a page layout setting item accordingly. In one embodiment, instead of performing OCR upon each image data, the image processor 14 provides an automatic object recognition setting item for the user after a page size included in image data conforms to a specific card/check/bill size, and the user may determine whether to select the automatic object recognition setting item to perform the OCR. The automatic object recognition setting item may further include a business card recognition (BCR) setting, which helps the user to collate and recognize information included on a business card, and classify the information into corresponding fields. Additionally, the user may add the recognized information on the business card to an electronic mail software and/or a contact list on the digital processing machine 100, or form a spreadsheet of the recognized information on the business card with the aid of the BCR setting. In another embodiment, when a page size included the image data IM conforms to a photo size, the M proper user setting items comprises a picture editing setting item for photo editing. For example, the user may edit photos by selecting multi-up printing, image rotation, image retouching and/or red eye removal. Instill another embodiment, the user scans the original S, which conforms to a specific size, for the purposes of obtaining electronic files rather than printing out paper documents. Hence, the digital processing machine 100 may provide an output destination setting item for the user to choose whether to transmit a facsimile electronically by the fax module 16, send an electronic mail by the network communication module 17 to, or store an electronic file to a storage apparatus via the connection interface 18. Further, the output destination setting item may provide different storage formats (e.g. JPG, PDF or RTF file formats) for user selection.

Figure 4:
FIG. 4 is a diagram illustrating image flipping of an even page according to an embodiment of the present invention.
Figure 4:
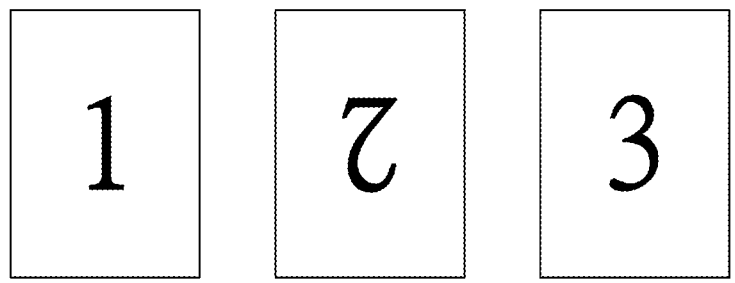
Figure 4:
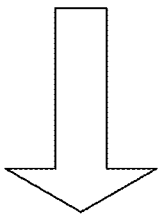
Figure 4:
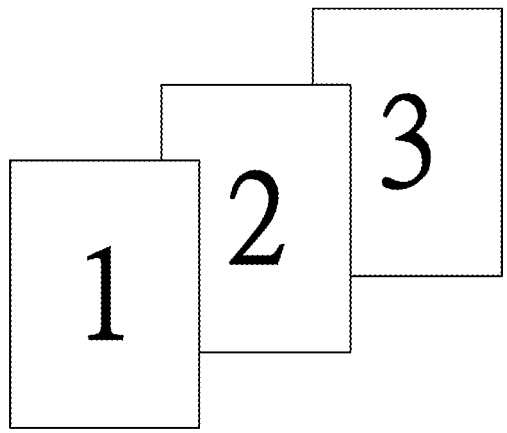

The image processor 14 may analyze an orientation of a page image. In one embodiment, when the analysis result RA indicates that the image data IM includes page images having different page orientations (e.g. two different orientations), the M proper user setting items may include an even page image flipping setting item. This usually happens when the user scans a book. Specifically, as a spine of a book to be scanned has to be placed on a predetermined side of a flatbed scanner, the user has to rotate the book 180 degrees in order to scan next page, resulting in that respective image orientations of an odd page and an even page are reverse of each other. FIG. 4 is a diagram illustrating image flipping of an even page according to an embodiment of the present invention. As shown in FIG. 4, an even page image flipping setting item may provide automatic page orientation correction. Hence, the user does not have to flip printed pages of a paper document or an electronic file manually.

The image processor 14 may further analyze contents of the image data IM. In one embodiment, the image processor 14 may utilize the OCR to analyze whether texts of the image data IM include an address message such as an electronic mail address or a fax number. When the analysis result RA indicates that the image data IM includes an address message, the M proper user setting items designated by the controller 10 may include an output destination setting item. In another embodiment, the image processor 14 may recognize whether the image data IM includes a member's name in the contact list built in the digital processing machine 100. If the image data IM does, the digital processing machine 100 may provide an output destination setting item for the user to transmit a facsimile or send an electronic mail.

To sum up, the proposed image reproducing method and digital processing machine can provide/display proper user setting items among numerous user setting items provided by the digital processing machine according to image data of an original, wherein remaining improper/unsuitable user setting items are omitted automatically for ease of user operation, thus offering a user-friendly experience and a convenient and rapid operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image reproducing method for a digital processing machine, comprising:
   scanning an original to generate image data;
   analyzing the image data to generate an analysis result;
   designating M proper user setting items among N user setting items according to the analysis result, wherein N and M are positive integers, and M is less than N;
   providing only the M proper user setting items on a human-machine interface so as to display only the M proper user setting items on a display of the human-machine interface; and
   outputting a copy of the original according to the image data and a user input, wherein the user input is received after a user selects one or multiple ones of the M proper user setting items through the display of the human-machine interface;
   wherein the M proper user setting items are designated and displayed before the user selects said one or multiple ones of the M proper user setting items and after the image data is analyzed.

2. The image reproducing method of claim 1, wherein when the analysis result indicates that the image data comprises two valid page images, the M proper user setting items comprise at least one of a page layout setting item and a duplex printing setting item.

3. The image reproducing method of claim 1, wherein when the analysis result indicates that an image page size included in the image data conforms to a specific size, the M proper user setting items comprises at least one of a page layout setting item, a picture editing setting item and an automatic object recognition setting item.

4. The image reproducing method of claim 1, wherein when the analysis result indicates that the image data comprises a blank image, the M proper user setting items comprises at least one of a blank page deletion setting item and a file splitting setting item.

5. The image reproducing method of claim 1, wherein when the analysis result indicates that the image data comprises a picture image, the M proper user setting items comprises at least one of a picture editing setting item and a color printing setting item.

6. The image reproducing method of claim 1, wherein when the analysis result indicates that the image data comprises page images having different page orientations, the M proper user setting items comprises an even page image flipping setting item.

7. The image reproducing method of claim 1, wherein when the analysis result indicates that the image data comprises an address message, the M proper user setting items comprises an output destination setting item.

8. The image reproducing method of claim 1, wherein before the step of scanning the original to generate the image data is performed, the image reproducing method further comprises:

utilizing an automatic sheet feeder to feed in the original.

9. A digital processing machine providing an intelligent human-machine interface, comprising:

a scanning apparatus, for scanning an original to generate image data;

a printing apparatus;

an image processor, for analyzing the image data to generate an analysis result;

an operating platform, wherein the operating platform comprises a display and is arranged for providing a human-machine interface; and a controller, operably coupled to the scanning apparatus, the printing apparatus, the image processor and the operating platform, the controller arranged for operating a user setting item designated process, designating only M proper user setting items among N user setting items according to the analysis result, and instructing the operating platform to display only the M proper user setting items on the display, wherein N and M are positive integers, and M is less than N;

wherein the printing apparatus outputs a copy of the original according to the image data and a user input; the user input is received after a user selects one or multiple ones of the M proper user setting items through the display; and the M proper user setting items are designated and displayed before the user selects said one or multiple ones of the M proper user setting items and after the image data is analyzed.

10. The digital processing machine of claim 9, wherein the digital processing machine further comprises at least one of a fax module, a network communication module, an external apparatus connection interface and a memory card interface; and each of the fax module, the network communication module, the external apparatus connection interface, the memory card interface and the printing apparatus outputs the copy of the original according to the user input received through the human-machine interface.

11. The digital processing machine of claim 9, further comprising:

an automatic sheet feeder, coupled to the scanning apparatus, the automatic sheet feeder arranged for feeding in the original and transporting the original to the scanning apparatus.

* * * * *